United States Patent [19]

Shoup et al.

[11] 4,059,658

[45] Nov. 22, 1977

[54] LOW TEMPERATURE PRODUCTION OF HIGH PURITY FUSED SILICA

[75] Inventors: Robert D. Shoup, Painted Post; William J. Wein, Lowman, both of N.Y.

[73] Assignee: Corning Glass Works, Corning, N.Y.

[21] Appl. No.: 613,202

[22] Filed: Sept. 15, 1975

[51] Int. Cl.$^2$ .............................................. C04B 35/14
[52] U.S. Cl. ................................... 264/43; 106/38.35; 264/56
[58] Field of Search ...................... 264/42, 63, 56, 43; 106/38.35

[56] References Cited

U.S. PATENT DOCUMENTS 3,678,144   7/1972   Shoup ..................................... 264/42

Primary Examiner—Robert F. White
Assistant Examiner—John Parrish
Attorney, Agent, or Firm—Clinton S. Janes, Jr.; Clarence R. Patty, Jr.

[57] ABSTRACT

The instant invention is directed to the production of high purity fused silica bodies by means of a three-step process. In the first step, various specifically-defined ratios of aqueous alkali metal silicates with colloidal silica or quaternary ammonium silicate are gelled with certain organic reagents. In the second step, the gelled silicate mass is leached in weakly acid solutions to yield bodies of very high porosity, i.e., greater than 50%, with mean pore diameters ranging between about 400A–4000A, but wherein the pore diameters are extraordinarily uniform within a particular body. Lastly, the microporous body is fired briefly at temperatures above about 1350° C. to consolidate the body to a solid transparent fused silica article having alkali metal contents less than 100 parts per million (PPM). The size of the pores, combined with the exceptional uniformity of pore sizes within an individual unit, is vital to achieve crack-free, homogeneous products.

4 Claims, No Drawings

LOW TEMPERATURE PRODUCTION OF HIGH PURITY FUSED SILICA

BACKGROUND OF THE INVENTION

Fused silica or quartz articles are well-known for certain physical characteristics which render them unique among glasses. For example, such glasses demonstrate excellent refractoriness, enabling their use at high temperatures; they exhibit chemical inertness, especially to acidic environments; and they possess a low coefficient of thermal expansion, i.e., about 5-10 × $10^{-7}/°C$. over the range of 0°-300° C. Such articles are presently formed by the fusion of slip cast structures, the fusion of structures deposited via flame hydrolysis techniques, or by melting at very elevated temperatures, e.g., 2000° C. and higher. The geometry and dimensions of shapes produced by those methods are somewhat limited and the physical properties vary according to the source of raw materials. Vitreous silica of very high purity is of great utility in the manufacture of waveguides.

High purity, vitreous silica has been prepared through the flame hydrolysis of such materials as silicon tetrachloride. The basic disclosure in that field is U.S. Pat. No. 2,272,342. However, because of the very nature of that production technique, the shape of the articles that can readily be formed is severely limited and the cost of manufacture is very high. Therefore, the capability of preparing fused silica articles of very high purity at relatively low cost and in essentially unlimited shapes would obviously be most attractive.

U.S. Pat. No. 3,678,144 describes a method for producing porous and non-porous silica-containing articles through the gelation of various aqueous silicate solutions. In carrying out the process, an aqueous solution having a pH between 10-15 and containing about 1-12 moles of $SiO_2$ per liter in solution was prepared from such aqueous silicate solutions as alkali metal silicates, colloidal silica, quaternary ammonium silicate, and mixtures thereof. A metal oxide was then added to that solution in such a form that it could be dissolved therein without reducing the pH thereof below 10. Thereafter, an organic reagent selected from the group consisting of formaldehyde, paraformaldehyde, formamide, glyoxal, methyl formate, methyl acetate, ethyl formate, ethyl acetate, and mixtures thereof was blended into the solution to reduce the pH of the solution and thereby cause polymerization of the silica to a coherent, porous mass, the admixed metal oxide becoming part of the silica network. In an optional embodiment, free alkali metal oxide could be removed via a leaching step in weak acids. Finally, where desired, the porous body could be consolidated to a solid glass through firing at elevated temperatures.

Other disclosures relating to the polymerization of aqueous silicate solutions utilizing the above-mentioned organic gelling agents can be found in U.S. Pat. Nos. 3,782,982 and 3,827,893.

Although porous articles could be secured by following the methods described in those patents, the total porosity and the diameter of the pores developed could be quite variable. This failing effectively proscribed the utility of those bodies in such applications as catalyst supports for air pollution control, filtration devices for gases and/or liquids, acoustical materials, and chromatographic supports.

U.S. application Ser. No. 440,693, filed Feb. 8, 1974 in the names of Blaszyk, Shoup, and Wein, now abandoned described means for preparing porous particulate and monolithic silica-containing materials having a broad range of pore sizes, but with a narrow distribution of pore sizes within a particular range. Thus, porous bodies could be produced wherein the pores varied in size between about 100A-10,000A (1 micron) and the mean pore size distribution comprised at least 80% being no greater than ±30% and, commonly, less than ±10% from the average diameter. Such bodies were prepared utilizing specifically-defined compositional combinations of aqueous lithium polysilicate, sodium silicate, potassium silicate, quaternary ammonium silicate, and colloidal silica with the above-noted organic gelation agents. In essence, the foundation of that invention was the determination of the required combination of aqueous silicates which, when polymerized by the organic gelling agent, yielded the desired porous structure. Leaching with weakly acidic leachants to remove free alkali metal oxide from the bodies was also observed.

Throughout the extensive research undertaken over the past years by numerous investigators in seeking to form glass articles through the gelation of aqueous silicate solutions, the principal stumbling block to success was the development of cracking, flaking, and/or spalling brought on by capillary forces arising during drying of the gelled masses. Such forces were especially harmful where the masses contained very small pores, i.e., less than about 300A. Thus, a prime objective of all that research has been to develop porous silica masses wherein the pore diameters are such that only small capillary forces exist and where the latter forces are much weaker than the silica bond strengths.

SUMMARY OF THE INVENTION

The present invention is founded upon the discovery that cracking, flaking, and/or spalling of porous silica masses prepared through the gelation of aqueous silicate solutions and colloidal solutions can be inhibited where the total porosity is at least 50%, the mean pore size therein is held to within about 400A-4000A, preferably 700A-2000A, and the distribution of the pore diameters is maintained exceedingly uniform within an individual unit, i.e., at least 80% of the pores are held within ±30% of the average. In the most preferred embodiment, the bodies will exhibit porosities in excess of 60%, the pore diameters will range between about 900A-1700A, and at least 80% of the pores will have a diameter ±20% of the average.

Experience has demonstrated that there is a dependence between the pore size of the precursor porous silica body and the consolidation time and glass quality of the final glass. Hence, as the pore size decreases, the porous masses consolidate more rapidly to good quality fused silica articles. Nevertheless, the capillary force problem noted above must be reckoned with. Therefore, the presence of pores of less than 400A ought to be carefully avoided and the pore size maintained as highly uniform as possible.

In carrying out the invention, we have found that very high purity, good quality silica glass can be produced through the gelation of the following combinations of aqueous silicate solutions and colloidal solutions with the above-described organic reagents. Thus, masses of high porosity with uniform pore sizes between 400A-4000A can be formed with sharply delineated combinations of potassium silicate solution with colloidal silica, potassium silicate and/or sodium silicate solution with quaternary ammonium silicate solution, and potassium silicate and/or sodium silicate solution with lithium polysilicate solution. Such combinations are gelled utilizing at least one organic reagent selected from the group consisting of formaldehyde, paraformaldehyde, formamide, glyoxal, methyl formate, ethyl formate, methyl acetate, and ethyl acetate. After leaching in weakly acid solutions, the porous body can be dried and consolidated to a high purity, good quality silica glass. Consolidation can be achieved with brief firings at temperatures in excess of 1350° C., normally about 1350°-1500° C.

DESCRIPTION OF THE PREFERRED EMBODIMENT

U.S. application Ser. No. 440,693, supra, discloses that porous, silica-containing bodies of relatively uniform pore size can be attained through the gelation of various combinations of alkali metal silicate solutions, quaternary ammonium silicate solution, and colloidal silica with organic reagents. That application pointed out that, whereas porous masses could be obtained through the reaction of any one of the silica-containing starting materials with an organic gelation agent, it was only when particular combinations of the starting ingredients in specifically-defined proportions were employed that pores of varying size, but with good uniformity of diameter in an individual body, could be achieved. Nevertheless, the articles illustrated in that application contained pores ranging in size between about 100A-10,000A. As has been observed above, the presence of pores having diameters less than 400A frequently leads to the development of cracks in the body during the drying step because of the influence of capillary forces. Furthermore, when the body is subsequently leached to secure high purity silica articles, cracks may be formed. Also, where pores having diameters in excess of 4000A are present, very long consolidation firing times are required and control of body dimensions is rendered more difficult as the mass undergoes the normal bulk shrinkage during the consolidation firing step.

Therefore, the instant invention is founded upon the discovery that very high purity, fused silica articles can be formed utilizing a methd involving three general steps:

First, a highly porous silica-containing mass containing pores varying between about 400A-4000A, but wherein the pore size is extremely uniform within any one particular mass, is prepared by reacting very narrowly-defined compositional combinations of aqueous sodium and/or potassium silicate solutions with quaternary ammonium silicate, lithium polysilicate, and/or colloidal silica with at least one of the organic gelation agents selected from the group formaldehyde, paraformaldehyde, formamide, glyoxal, methyl formate, methyl acetate, ethyl formate, and ethyl acetate for a sufficient length of time to polymerize the silica into a coherent, porous gelled mass;

Second, the porous gelled mass is contacted with a weakly acidic solution to remove free alkali metal ions; and Third, the mass is consolidated into a solid glass article by firing at temperatures in excess of 1350° C.

Whereas any aqueous silicate solution or colloidal silica solution can be successfully employed in the instant invention having a pH between about 11-15 and which contains about 1-12 moles of $SiO_2$ per liter in solution, commercially-available solutions were employed in the following examples in the interests of economy and efficiency. The compositions of those solutions are recorded below in weight percent:

Potassium silicate — 8.3% $K_2O$, 20.8% $SiO_2$, balance $H_2O$

Sodium silicate — 6.8% $Na_2O$, 25.3% $SiO_2$, balance $H_2O$

Quaternary ammonium silicate — 9.9% quaternary ammonium ions, 45% $SiO_2$, balance $H_2O$ Lithium polysilicate — 2.1% $Li_2O$, 20% $SiO_2$, balance $H_2O$ Colloidal silica — 40% $SiO_2$, balance $H_2O$ The ability to produce porous silica bodies with varying pore dimensions is founded upon the relationship of the silicate solutions and/or the colloidal silica with each other. Thus, as has been explained above, the operable combinations of starting $SiO_2$-containing ingredients include: potassium silicate with colloidal silica; potassium and/or sodium silicate with quaternary ammonium silicate; and potassium and/or sodium silicate with lithium polysilicate. We have found that the ranges of starting ingredients operable in the instant invention, utilizing the above-cited solutions, comprise 50-90% by weight sodium silicate and/or potassium silicate and 10-50% quaternary ammonium silicate, lithium polysilicate, or colloidal silica. Thus, where other starting solutions and colloidal solutions are employed having different amounts of $Na_2O$, $K_2O$, $Li_2O$, etc., the proportions utilized will be adjusted to yield proportions equivalent to those cited for the materials used herein.

Where less than about 50% of the sodium silicate and/or potassium silicate solution is employed, the pore size falls below about 400A with consequent cracking of the body during the drying step. Also, removal of the free alkali metal ions from the body becomes very difficult. On the other hand, where more than about 90% of the sodium silicate and/or potassium silicate solution is utilized, bubbles, voids, and other macroporosity frequently result leading to cracking during the drying step.

Table I records a group of examples prepared with mixtures of the potassium silicate and colloidal silica solutions noted above. The colloidal silica was first placed in a container formed from a plastic inert to the solutions to be added. The potassium silicate solution was added slowly thereto with stirring to produce a homogeneous solution. Reagent grade formamide was thereafter admixed with rapid stirring to eliminate any gelled particles that might form. Both of these mixing operations were carried out at room temperature and at atmospheric pressure as a matter of convenience, although any temperature ranging between the freezing point and boiling point of the solutions can be successfully utilized. Since, in general, the rate of reaction is greater at high temperatures, the use of a positive pressure can be helpful in permitting higher temperatures without the danger of boiling the solutions and preventing macroporosity which would lead to seeds in the fused silica. However, the normal routine in the laboratory has involved gelation at ambient pressure at temperatures between about 20°-90° C. for periods of time ranging between about 10 minutes to 2 hours.

In the following examples the gelled mass assumed the shape of the plastic container with a linear shrinkage of about 10-25%. The resultant gel structure exhibited high porosity and was contacted with weakly acid solutions having a pH greater than about 4, such as an aqueous 1M $NH_4NO_3$ solution, to remove residual $K_2O$, thereby yielding a porous $SiO_2$ body with far less than 1% impurities. In the gelled masses of Table I, the leaching was undertaken by immersing into the above $NH_4NO_3$ solution at room temperature. The mechanism of leaching is diffusion controlled such that the rate thereof can be accelerated by increasing temperature. If the pH of the leached solution is decreased too rapidly, differential condensation of the silica structure can occur which leads to radial cracking of the body. Also, if the silica mass resides too long at high pH, i.e., greater than about 6, dissolution of the silica surface is hazarded, particularly at high temperatures.

TABLE I

| Example No. | Composition | Average Pore Diameter |
|---|---|---|
| 1 | 40 grams potassium silicate<br>60 grams colloidal $SiO_2$ | <400A |
| 2 | 50 grams potassium silicate<br>50 grams colloidal silica | 400A |
| 3 | 60 grams potassium silicate<br>40 grams colloidal silica | 600A |
| 4 | 70 grams potassium silicate<br>30 grams colloidal silica | 1000A |
| 5 | 80 grams potassium silicate<br>20 grams colloidal silica | 1700A |
| 6 | 90 grams potassium silicate<br>10 grams colloidal silica | 2200A |
| 7 | 100 grams potassium silicate | 2850A |

All of the above bodies exhibited porosities in excess of 70% and the size of the pore diameters was extremely uniform except for Example 7, the 100% potassium silicate body. Measurements of pore size, conducted following conventional porosimetry techniques employing mercury intrusion, demonstrated that at least 80% of the pores were within ±30% of the average pore diameter and, commonly, 80% were within ±20% of the average, except for Example 7. Cracks also developed within Example 7 during the subsequent drying in air.

The leaching step has for its purpose the removal of alkali metal ions from the body so as to leave a body of very high purity silica. Its effect upon total porosity and pore size of the gelled body is essentially negligible since the amounts of alkali present are small and the silica is substantially undisturbed by the leachant. Thus, the porous gelled body can be simply dried and used as such. However, the presence of the alkali metal ions deleteriously affects the refractoriness and chemical durability of the body, so the practice much to be preferred is to remove the free alkali such that the physical and chemical characteristics of the resulting highly pure silica can be enjoyed. Normally, the variation between the leached and unleached articles will be less than 10% and, frequently less than 5%.

Gelation takes place in these silicate solutions when the latent acid gel reagent, e.g., formamide, hydrolyzes in basic media to form ammonium formate. This hydrolysis causes the pH of the solution to be reduced below about 11 where spontaneous polymerization of the silicate structures begins. Hence, gelation time, defined herein as the period required for the silica gelled masses to harden sufficiently to permit removal from the plastic container or other mold, is a function of three parameters.

First, the ratio of potassium silicate solution-to-colloidal silica in the precursor mixture.

Second, the amount of organic gel reagent admixed with the precursor mixture.

Third, the temperature of the precursor mixture.

Table II points out that the pH of the precursor mixture obtained by blending potassium silicate solution into the colloidal silica solution decreases as the proportion of colloidal silica in the mixture increases. This results from the fact that the colloidal silica solution has a lower pH than the potassium silicate solution. Therefore, at constant formamide concentrations, the necessary pH to cause polymerization of the silica will be achieved more quickly in those precursor mixtures having the lowest initial pH. The actual gel times of several mixtures of potassium silicate solution and colloidal silica solution with formamide at room temperature (R.T.) and at 50° C. are also reported in Table II.

TABLE II

| Potassium Silicate | Colloidal Silica | pH of Mixed Solution | Formamide | Gel Time R.T. (Hours) | Gel Time 50° C. (Hours) | pH of Supernatant Gel Solution |
|---|---|---|---|---|---|---|
| 100 grams | — | 11.90 | 10 grams | ~16 | <1 | 10.77 |
| 70 grams | 30 grams | 11.64 | 10 grams | ~4 | <1 | 10.75 |
| 50 grams | 50 grams | 11.58 | 10 grams | ~2 | <1 | 10.74 |

Hydrolysis of higher concentrations of formamide will reduce the pH more rapidly to the level to initiate polymerization of the silica. Thus, higher concentrations of formamide can be employed to expedite the reaction but care must be exercised to avoid too rapid gelation, because this can lead to broad pore distribution. Also, of course, the use of greater amounts of formamide increases the cost of production.

Finally, as is demonstrated in Table II, higher temperatures increase the hydrolysis rate of the formamide and faster gel rates are observed. However, heating of the mass should be as uniform as possible to avoid differential shrinkage in the gelled body. Experience has shown that heating of the gel structure to at least 80° C. is very desirable in improving the strength of the body. However, care must be exercised in heating the precursor solutions to avoid the formation of gas bubbles at the interface between the solution and the container and, also, within the gel structure itself. These can lead to interior seeds and surface imperfections in the final fused silica body. This has led to a general practice of allowing the solution mixture to react and polymerize to a rigid gel at room temperature, usually accomplished in about 2–4 hours, and then heating. Nevertheless, if the formation of bubbles can be prevented, e.g., by utilizing an atmosphere of positive pressure, heating can be initiated immediately to thereby permit faster processing.

The mechanism of leaching is diffusion-controlled so the rate of leaching can be accelerated by increasing the temperature. Nevertheless, as was observed above, the pH of the leached solution must not be reduced too rapidly or differential condensation of the silica structure can occur which induces radial cracking. Therefore, weakly acid (pH greater than about 4) leachants are customarily employed. Finally, the silica body should not be held for long periods in environments of high pH, i.e., greater than 6, since there is a danger of dissolution of the silica surface, particularly at high temperatures.

We have found it desirable with gelled silica bodies having thicknesses in excess of 0.5 inch to use leaching solutions at temperatures of at least 70° C. and, most preferably, at temperatures between 90° C. and the boiling point of the solution. Thus, samples having a thickness of 1 inch and pore sizes less than about 700A showed a rather high residual alkali metal content when leached in solutions at 50° C. for a week.

The most successful technique employed to remove alkali metal ions from the porous gelled masses has involved the use of aqueous $NH_4NO_3$ solutions as buffers to prevent a too rapid decrease in pH. In the preferred practice, 1M $NH_4NO_3$ solution (pH somewhat greater than 4.5) is added in sufficient quantity to reduce the pH of the leach solution one unit in a 1-2 hour exposure at temperatures above 70° C. Successive changes of this nitrate solution are made until the pH is lowered in steps to below 6. At that pH, the residual alkali content will be less than about 0.05%. Thereafter, a cation exchange resin, e.g., AMBERLITE ® IR-120, manufactured by The Rohm and Haas Company, Philadelphia, Pa., is slowly added to reduce the pH to less than 3, whereupon excess resin is added and the body allowed to remain immersed in the solution for 3-4 hours at 90° C.

Table III illustrates the effect of various leaching techniques involving $NH_4NO_3$, cation exchange resins, and/or acidic solutions as leachants. Each sample was prepared by gelling a mixture of 80 grams potassium silicate solution and 20 grams colloidal silica solution with 10 grams of formamide at room temperature.

The first sample was leached in an aqueous 1M $NH_4NO_3$ solution only to a minimum pH of about 4.5. After rinsing in distilled water, the levels of $Na_2O$ and $K_2O$ were analyzed spectrographically. $Na_2O$ is present as an impurity or stabilizing additive in the starting materials.

The second sample was subjected to immersions in aqueous 1M $NH_4NO_3$ followed by immersion into an aqueous solution of AMBERLITE ® IR-120 cation (H+ form) exchange resin. The final pH of the leaching solution was about 2.5.

The third sample saw the same procedures as the second sample plus an additional exposure to an aqueous 0.1M $HNO_3$ solution containing the cation exchange resin.

All leaching was undertaken under ambient conditions with leaching solutions at a temperature of 85° C.

TABLE III

| | wt.% $Na_2O$ | wt.% $K_2O$ |
|---|---|---|
| 1M $NH_4HO_3$ solution (10 changes) | <100 PPM | <100 PPM |
| Distilled water (3 rinses) | | |
| 1M $NH_4NO_3$ solution (10 changes | <10 PPM | <100 PPM |
| Cation exchange resin (24 hours) | | |
| Distilled water (3 rinses) | | |
| 1M $NH_4NO_3$ solution (10 changes) | <30 PPM | <100 PPM |
| Cation exchange resin (24 hours) | | |
| 0.1M $HNO_3$ in cation exchange resin (24 hours) | | |
| Distilled water (3 rinses) | | |

As can be seen, very pure silica bodies can be achieved by the method of the invention. The use of more severe leaching conditions and/or utilizing starting materials of higher purity can lead to even lower levels of impurities.

The first step leading to consolidation of the porous gelled mass into a solid body of fused silica glass comprises drying to remove relatively loosely-held water, organic reagent, etc. Such drying can be accomplished by merely allowing the body to stand in the ambient environment, although forced draft drying at 50°-100° C. greatly expedites the process. However, where the pore size is smaller than about 700A, too rapid drying can lead to the occurrence of cracking in the structure.

After this preliminary drying step, the bodies will then normally be subjected to a pre-firing treatment. That is, the dried porous articles are heated to about 1000°-1100° C, and held thereat for about one hour. This practice serves to remove most of the water in the structure and also to strengthen the body considerably, e.g., from a compressive strength of about 400 psi up to about 1500 psi. In general, the temperature of the body is raised at a rate not exceeding about 300° C./hour to insure against too rapid removal of the residual water with consequent cracking. After this pre-firing treatment, the body can be examined by audio or visual means, for example, nondestructive sonic testing, to detect the presence of cracks. The sound bodies can then be fired to consolidate to transparent, homogeneous, fused silica glasses, or, if desired, they can be stored at room temperature until some later time. Very little water pickup has been observed in such stored articles, and this has had no deleterious effect when such articles have been plunged into a furnace operating at about 1450° C.

In general, consolidation of the porous, pre-fired structure will be undertaken at temperatures in excess of about 1350° C. and, preferably, between about 1400°-1500° C. Heating of the article should be relatively uniform since different consolidation rates can result in distortion of the shape. Large bodies will desirably be supported to preclude deformation and sagging. Any type of physical support should be free from alkali metal oxides because contact therewith leads to surface crystallization of cristobalite on the glass body. For highest purity and greatest clarity, the consolidation will be conducted in a controlled inert atmosphere, such as He, rather than in air.

The rate of consolidation to transparent fused silica is a function of pore size where the temperature is maintained constant. Table IV depicts relative consolidation times for articles fired in a helium atmosphere at 1450° C. to be converted to optically clear, fused silic bodies. The samples were discs about 2 inches in diameter and ⅜ inch thick which were made from various mixtures of potassium silicate solution and colloidal silica solution gelled with formamide and leached in accordance with the technique recorded for the second sample in Table III. It is believed to be apparent from Table IV that longer consolidation times are required for those articles having larger pores. Furthermore, an improvement in clarity, i.e., fewer inclusions or seeds, was observed in articles containing smaller pores.

Clarity of the fused body is also reflected, at least somewhat, in the refractive index. Table IV notes that a constant value therefor is obtained by consolidating porous bodies wherein the average pore size is less than about 2000A.

TABLE IV

| Average Pore Size | Consolidation Time (Minutes) | Refractive Index |
| --- | --- | --- |
| 3600A | 45 – 55 | 1.454 – 1.458 ± 0.001 |
| 2500A | 30 – 40 | 1.455 ± 0.001 |
| 1500A | 10 – 15 | 1.458 ± 0.0005 |
| 700A | 6 – 8 | 1.458 ± 0.0005 |
| 500A | 3 – 4 | 1.458 ± 0.0005 |
| 300A | 2 – 3 | 1.458 ± 0.0005 |

The following examples are illustrative of the operability of the instant invention with mixtures of potassium silicate with lithium polysilicate, sodium silicate with lithium polysilicate, and sodium silicate and/or potassium silicate with quaternary ammonium silicate. In each example, the commercially-available solutions referred to above were employed.

EXAMPLE A

To 30 grams of potassium silicate solution were added 15 grams of distilled water and six grams of formamide. Dilution with water aids in lowering the viscosity of the solution so it is more easily poured. This mixture was then rapidly added with stirring to 30 grams of lithium polysilicate solution in a plastic container to produce a homogeneous solution. Both of those steps were conducted at ambient temperatures and pressures. Gelation was accomplished at slightly elevated temperatures, e.g., 70°–90° C., for periods of time ranging between about 10 minutes to one hour.

The resulting porous body, having assumed the shape of the plastic container, but exhibiting a linear shrinkage up to 25%, was removed from the container and immersed into the above-cited aqueous 1M $NH_4NO_3$ solutions to reduce the pH of at least below 6 and to remove free $K^+$ and $Li^+$ ions therefrom. A body having a porosity of about 77% and a mean pore diameter of approximately 1000A was achieved. Porosimetry determinations indicated that more than 80% of the pores were within ±30% of the average pore diameter.

A consolidated transparent article was formed when the porous body was fired in a helium atmosphere at 1450° C. for 10 minutes.

EXAMPLE B

After 15 grams of distilled water and eight grams of formamide were blended into 60 grams of sodium silicate solution. The mixture was then rapidly mixed into 40 grams of lithium polysilicate solution contained within a plastic vessel. As in Example A, both of these operations were undertaken at ambient temperatures and pressures. Gelation was performed at slightly elevated temperatures for times of less than about 1 hour.

The gelled body was highly porous and exhibited a linear shrinkage approaching 25%. After immersion in aqueous 1M $NH_4NO_3$ solutions, the body demonstrated a porosity of about 72% and a mean pore diameter of about 2000A. Porosimetry measurements evidenced that more than 80% of the pores were within ±30% the average pore diameter.

Firing in a helium atmosphere at 1450° C. for 20 minutes produced a consolidated transparent article.

EXAMPLE C

To 50 grams of sodium silicate solution were added 25 grams of distilled water and eight grams of formamide. This mixture was then stirred into 50 grams of lithium polysilicate solution in a plastic container. Again, both of those mixing steps were carried out at ambient temperatures and pressures. Slightly elevated temperatures at times ranging between about 10 minutes to one hour was employed in gelling the mixture.

The highly porous gelled body again manifested a linear shrinkage approaching 25%. A porosity of about 81% with a mean pore diameter of about 1800A was determined after the body was immersed into aqueous 1M $NH_4NO_3$ solutions. In excess of 80% of the pores were found to be within ±30% of the average pore diameter via porosimetry measurements.

A consolidated transparent article was produced after firing in a helium atmosphere for 20 minutes at 1450° C.

EXAMPLE D

To 60 grams of sodium silicate solution were added eight grams of formamide. Dilution with distilled water was not practiced since easily-pourable, homogeneous solutions were obtained without such. This mixture was then rapidly added with stirring to 40 grams of quaternary ammonium silicate solution in a plastic container. Both mixing steps were conducted at ambient temperatures and pressures. Gelation was accomplished at 70°–90° C. for periods of time ranging between about 10 minutes to 1 hour.

Since the mixtures were not diluted with water, the linear shrinkage of the porous gelled body was somewhat less than exhibited in Examples A–C, supra, but it still exceeded 10%. Upon immersion of the body into aqueous 1M $NH_4NO_3$ solutions to reduce the pH at least below 6 and remove free $Na^+$ ions therefrom, a porosity of about 74% and a mean pore diameter of about 900A were measured. Porosimetry determinations evidenced that more than 80% of the pores were within ±30% of the average pore diameter.

Firing the porous body at 1450° C. for 10 minutes in a helium atmosphere yielded a consolidated transparent article.

EXAMPLE E

About 50 grams of sodium silicate solution were blended with eight grams of formamide. The mixture was then stirred into 50 grams of quaternary ammonium silicate solution contained within a plastic vessel. As above, both of these mixing steps were undertaken at ambient temperatures and pressures. Gelation was conducted at slightly elevated temperatures for times ranging between about 10 minutes to one hour.

The resulting porous body demonstrated a linear shrinkage in excess of 10%. Following immersion into aqueous 1M $NH_4NO_3$ solutions, the body exhibited a porosity of about 69% with a mean pore diameter of about 500A. Porosimetry measurements indicated that more than 80% of the pores were within ±30% of the average pore diameter.

A consolidated transparent article was obtained by firing the porous body for 10 minutes at 1450° C. in a helium atmosphere.

EXAMPLE F

Potassium silicate solution in an amount of about 70 grams was combined with eight grams of formamide. This combination was then rapidly blended into about 30 grams of quaternary ammonium silicate solution contained within a plastic vessel. Both of those operations were undertaken at ambient temperatures and presures. Slightly elevated temperatures (70°–90° C.) and periods of time varying between about 10 minutes to 1 hour were utilized to produce gelation.

The porous body exhibited a linear shrinkage of about 10–25% and, after immersion into aqueous 1M $NH_4NO_3$ to lower the pH at least below 6 and to remove free $K^+$ ions therefrom, showed a porosity of about 74% and a mean pore diameter of about 900A. Porosimetry measurements determined that more than 80% of the pores were within ±30% of the average pore diameter.

Firing the porous body for 10 minutes at 1450° C. in a helium atmosphere resulted in a consolidated transparent article.

EXAMPLE G

To 60 grams of potassium silicate solution were admixed eight grams of formamide. The mixture was then rapidly stirred into 40 grams of quaternary ammonium silicate solution in a plastic container. Both steps were conducted at ambient temperatures and pressures. Gelation was achieved at slightly elevated temperatures for periods of time ranging between about 10 minutes to 1 hour.

The resulting highly porous body demonstrated a linear shrinkage of about 10–25%. After immersion into aqueous 1M $NH_4NO_3$ solutions, the body manifested a porosity of about 50% with a mean pore diameter of about 500A. Porosimetry measurements indicated that in excess of 80% of the pores were within ±30% of the average pore diameter.

A transparent consolidated article was produced upon firing the porous body for 10 minutes at 1450° C. in a helium atmosphere.

We claim:

1. A method for producing a solid, homogeneous, transparent fused silica article having an alkali metal content less than about 100 PPM which comprises:
   a. preparing solutions having a pH between about 11–15 and containing about 1–12 moles $SiO_2$/liter in solution from silicate solutions selected from the group consisting of potassium silicate, sodium silicate, quaternary ammonium silicate, lithium polysilicate, and colloidal silica;
   b. combining those solutions in one of the indicated proper proportions in weight percent equivalent to:
      A. 50–90% potassium silicate solution and 10–50% colloidal silica solution wherein said potassium silicate solution consists essentially, by weight, of 8.3% $K_2O$, 20.8% $SiO_2$, balance $H_2O$ and said colloidal silica solution consists essentially, by weight, of 40% $SiO_2$, balance $H_2O$;
      B. 50–90% potassium silicate solution and/or sodium silicate solution and 10–50% quaternary ammonium silicate wherein said potassium silicate is that defined in (A), said sodium silicate consists essentially, by weight, of 6.8% $Na_2O$, 25.3% $SiO_2$, balance $h_2O$, and said quaternary ammonium silicate solution consists essentially, by weight, of 9.9% quaternary ammonium ions, 45% $SiO_2$, balance $H_2O$;
      C. 50–90% potassium silicate solution and/or sodium silicate solution and 10–50% lithium polysilicate solution wherein said potassium silicate solution is that defined in (A), said sodium silicate solution is that defined in (B), and said lithium polysilicate solution consists essentially, by weight, of 2.1% $Li_2O$, 20% $SiO_2$, balance $H_2O$;
   c. reacting an organic compound therewith selected from the group consisting of formaldehyde, paraformaldehyde, formamide, glyoxal, methyl formate, methyl acetate, ethyl formate, ethyl acetate, and mixtures thereof at a temperature between the freezing point and the boiling point of the solution for a sufficient length of time to reduce the pH of the silicate solution below about 11 and to polymerize the silica into a coherent, porous gelled body;
   d. leaching said gelled body with a weak acid solution having a pH greater than about 4 to reduce the pH to at least below 6 to thereby yield a porosity of at least 50% with meon pore diameters ranging between 400A to 4000A and wherein at least 80% of the pores fall within ±30% of the average pore diameter;
   e. consolidating said porous body into a solid, transparent body by firing at temperatures between about 1350°–1500° C.

2. A method according to claim 1 wherein said porous gelled body has a porosity of at least 60% with mean pore diameters ranging between about 900A–1700A and wherein at least 80% of the pores fall within ±20% of the average pore diameter.

3. A method according to claim 1 wherein, after said gelled body has been leached with said weak acid solution, it is contacted with a cation exchange resin to reduce the pH to below 3.

4. A method according to claim 1 wherein said weak acid solution is an aqueous 1M $NH_4NO_3$ solution.

* * * * *

UNITED STATES PATENT AND TRADEMARK OFFICE
CERTIFICATE OF CORRECTION

PATENT NO. : 4,059,658

DATED : November 22, 1977

INVENTOR(S) : Robert D. Shoup and William J. Wein

It is certified that error appears in the above-identified patent and that said Letters Patent are hereby corrected as shown below:

Column 4, line 58, "high" should be -- higher --.

Column 8, line 61, "silic" should be -- silica --.

Column 10, line 12, "was" should be -- were --.

Column 12, line 12, "h$_2$0" should be -- H$_2$O --.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*